United States Patent [19]

Jacob

[11] 3,718,769

[45] Feb. 27, 1973

[54] PATH FINDING SYSTEM FOR TIME-DIVISION MULTIPLEXED TELEPHONE COMMUNICATION NETWORK

[75] Inventor: Jean-Baptiste Jacob, Saint-Quay-Perros, France

[73] Assignee: Compagnie Industrielle Des Telecommunications Cit-Alcatel, Paris, and Societe Lannionnaise D'Electronique Route de Perros-Guirec, Lannion, both of France

[22] Filed: June 29, 1970

[21] Appl. No.: 50,692

[30] Foreign Application Priority Data

June 27, 1969 France ................................6921828

[52] U.S. Cl. .............................179/18 J, 179/15 AQ

[51] Int. Cl. ............................................H04q 11/04

[58] Field of Search .179/18 ES, 18 J, 18 EA, 15 AT, 179/18 AF, 15 AQ

[56] References Cited

UNITED STATES PATENTS

| | | | |
|---|---|---|---|
| 3,573,381 | 4/1971 | Marcus | 179/15 AQ |
| 3,524,946 | 8/1970 | Pinet et al. | 179/18 J |
| 3,458,659 | 7/1969 | Sternung | 179/15 |
| 3,462,743 | 8/1969 | Milewski | 340/172.5 |
| 3,415,955 | 12/1968 | Singer | 179/18 G |
| 3,514,541 | 5/1970 | Inose et al. | 179/15 AQ |
| 3,504,123 | 3/1970 | Fischer et al. | 179/15 AT |

*Primary Examiner*—Thomas W. Brown
*Attorney*—Craig, Antonelli and Hill

[57] ABSTRACT

A path finding test device, more particularly for time switching, comprising input switches, intermediate switches and output switches, this device comprising a centralized memory representing the occupied or free state of all the intermediate switches so that the search for an available itinerary takes place by reading, in the memory, the free state of the intermediate switches.

The invention may be applied to the telecommunication industry.

8 Claims, 3 Drawing Figures

Figure 1:
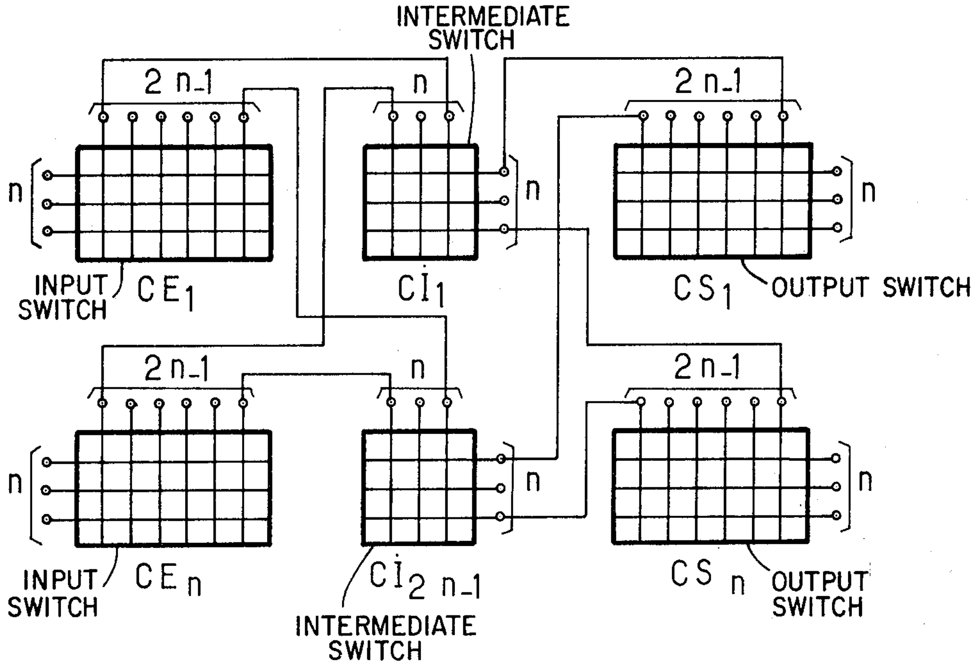

PATH FINDING SYSTEM FOR TIME-DIVISION MULTIPLEXED TELEPHONE COMMUNICATION NETWORK

The present invention relates to an itinerary or path finding test device which is usable notably in a connection network for time shared or time division multiplex.

Already known are various path finding test devices in spatial — either conventional or electronic — commutation, and it is known that these devices have the purpose of rapidly determining whether an available itinerary or path exists between two points of a connecting network, which are generally an input of the network which corresponds, for example, to a calling subscriber, and an output of the network which corresponds, for example to a subscriber being called, or else to a lead junction.

These itinerary test devices are generally based upon the existence of an "image" network; that is to say, of an unifilar network that provides all of the connection possibilities between any two points of the network; generally speaking, the passage of a current between two extremities of the image network indicates the availability of the corresponding line. The test of the successive sections from one stage to the other by means of cores, for example, determines a precise available path.

On the other hand, the structure of networks in stages as used in time switching systems, according to U.S. application Ser. No. 39,786 filed by applicant on May 22, 1970 entitled "Multi-Stage Time Connection Network Arrangement Adapted To Be Used More Particularly in Telephone Switching," still comprises an input stage, an intermediate stage, and an output stage. The input stage consists of a certain number $p$ of input time switches with $n$ inputs and $m$ outputs, the intermediate stage comprises $m$ square switches (or $m$ intermediate time networks) having P inputs and $p$ outputs, and the output stage consists of the same number $p$ of time output switches with $m$ inputs and $n$ outputs.

In this type of network, the choice of the incoming network line and of the outgoing network line as well as of the respective time channels on these network lines is made by external members at the connecting network. These data thus establish the input and output elements, and in order to establish their connection, it is necessary to find an intermediate switch having a free time channel on the incoming link network which unites it to the input switch, the number of which is given, and a free time channel on the outgoing link network which unites it to the output switch, the number of which is equally given. Moreover, the present invention uses the same switch structure as that which has been described by applicant in the aforementioned patent application.

The present invention is concerned with a path finding or itinerary test method usable notably in a connecting network for time switching, characterized in that the data or information concerning the itineraries or paths are contained in a memory, more particularly a centralized storage, and in that the storage is tested so as to determine an available itinerary or path between two points of a connecting network. The present invention is concerned also with a test device which is used for carrying out the aforementioned method.

The itinerary test device according to the present invention is characterized in that it comprises a centralized memory or storage which contains the state or condition of engagement of all the intermediate switches so that the determination of an available switch and consequently the search for an available itinerary or path is made by reading in the memory or storage the states or conditions of engagement of the intermediate switches.

When according to one characteristic or embodiment of the present invention each network line comprises 32 time channels and each time intermediate switch is square and comprises $n$ incoming links and $n$ outgoing links, there will thus have to be $2n$ words of 32 binary elements to indicate the state of engagement of an intermediate switch.

According to another characteristic of the present invention, the itinerary test, in other words, the search for an adequate intermediate switch, is made by reading in the storage or memory the conditions of engagement and, in the group of the $2n$ words corresponding to the intermediate switch being tested, the two words relative, respectively, to the incoming link and to the outgoing link, the address of these two words being determined by the numbers of the input and output switches, if each of these two words contains a free time channel, the intermediate switch that contains them is chosen as well as the free time channel, and the connection may be established.

The release of the itinerary which occurs when the subscriber hangs up and which is translated by the reception in the connecting network of the number of the time channel and of the network line to be released is obtained, according to one characteristic of the present invention, by the successive search of the words used in the controlling memories or storages from the output switch and by their becoming effaced, and a resetting to zero of the binary elements corresponding to the itinerary or path to be disengaged or released takes place and is effected in the storage of the conditions concerning the engagement.

It has been noted, on the other hand, in the above-mentioned application filed by applicant that the condition for obtaining a non-blocking connecting network in a network in stages comprising $n$ input switches with $n$ inputs and $(2n-1)$ outputs had to have $(2n-1)$ intermediary switches with n inputs and n outputs.

According to a further characteristic of the present invention it is proposed that the test in connection with the path search is always begun with the intermediate and partially engaged switches and that the test be continued with the entirely free or disengaged intermediate switches, if the first test has not been completed. The experience and the simulating programs show that this procedure tends to reduce the amount of blocking.

Figure 3:
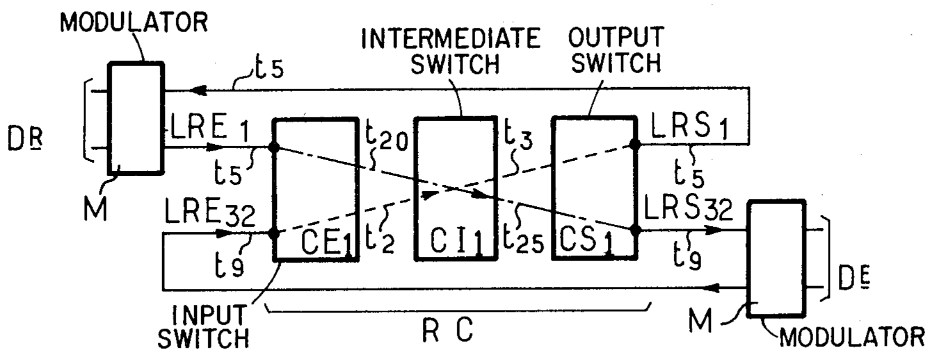
Figure 2:
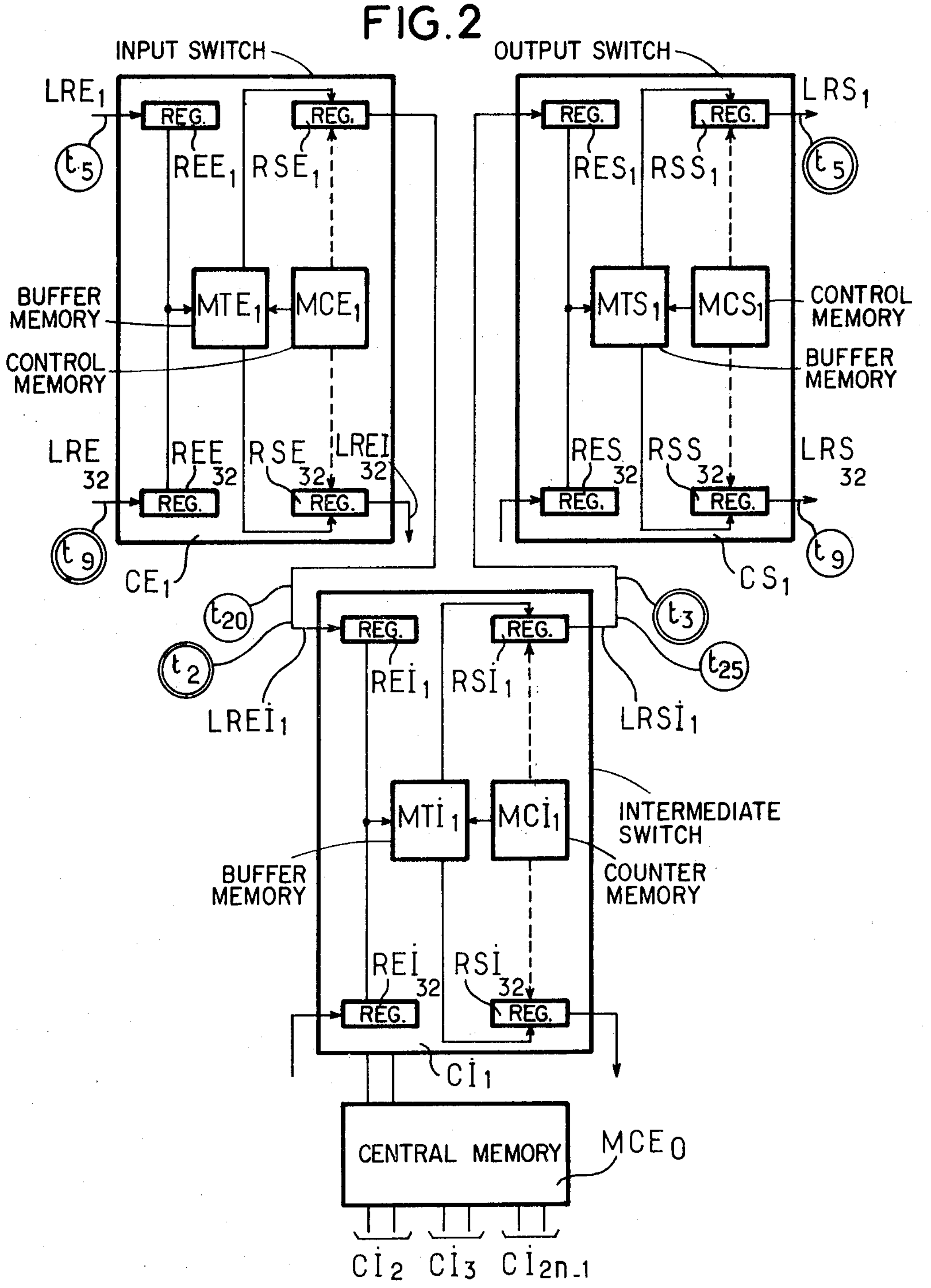

The present invention will be better understood on the basis of the detailed description of one embodiment thereof, which is given by way of example and not to be construed as limitative, taken in connection with the accompanying drawings, wherein FIG. 1 illustrates schematically a non-blocking connecting network in the case where the path finding search according to the invention is applied;

FIG. 2 is a partial illustration of a connecting network in three stages of internal construction according to the above-mentioned patent application, and FIG. 3 illustrates a path between caller and person called through the connecting network.

FIG. 1 represents a non-blocking time division multiplex connecting network structure which has already been described in the aforementioned patent application filed by applicant. In such a structure, the input stage comprises $n$ switches $CE_1$ to $CE_n$ with $n$ inputs and $m$ or $(2n-1)$ outputs; the intermediate stage comprises $m$ or $(2n-1)$ intermediate switches $CI_1$ to $CI_{(2n-1)}$ with $n$ inputs and $n$ outputs and the output stage comprises, like the input stage, $n$ switches $CS_1$ to $CS_n$, each switch having $m$ or $(2n-1)$ inputs and $n$ outputs. Such a network comprises thus $N = n^2$ incoming network lines and $n^2$ outgoing network lines. Each of the $(2n-1)$ outputs of one input switch, $CE_1$ for example, is united by a link to one input of each of the $(2n-1)$ intermediate switches and, in an analogous manner, each of the $(2n-1_1$, is connected or united by a link to one output of each of the $(2n-1)$ intermediate switches.

FIG. 2 illustrates partially a time division multiplex connecting network with the internal structure of each switch. Each time input switch, such as $CE_1$, each time output switch, such as $CS_1$, or time intermediate switch, such as $CI_1$ comprises 32 registers $REE_1$ . . . $REE_{32}$, $RES_1$ . . . $RES_{32}$, $REI_1$ . . . $REL_{32}$, each of which receives one network line $LRE_1$ to $LRE_{32}$, the 32 input registers $REE_1$ . . . $REE_{32}$ being associated with a buffer memory $MTE_1$ . . . , and 32 output registers $RSE_1$ . . . $RSE_{32}$ each of which gives rise to one network line; the 32 output registers being associated with a control memory $MCE_1$, and the connection of a free path from the caller toward the person called is effected through the three switches $CE_1$, $CS_1$, $CI_1$, and with the latter there is associated a central memory or storage $MCE_o$ for the conditions of engagement. On the 32 input registers $REE_1$ to $REE_{32}$ of the input switch $CE_1$ there terminate respectively 32 incoming network lines $LRE_1$ to $LRE_{32}$. A buffer memory MTE1 consists of 32 blocks or elementary memories comprising each 32 words of eight binary elements; the elementary memories being addressable storages. A control storage memory $MCE_1$ comprises 1,024 words, like the buffer memory, but with 10 binary elements, and allows for addressing one word among 1,024. These 1,024 words also constitute 32 blocks of 32 words, one block being associated with an output register. The switch $CE_1$ equally comprises 32 output registers from which issue 32 intermediate network lines $LREI_1$ . . . $LREI_{32}$ toward the input registers of the intermediate switches, such as $CI_1$ of the intermediate stage. These hookups between the output registers of $CE_1$ and the input registers of the switches $CI_1$ are made according to the links of a network analogous to that of FIG. 1.

The same internal structure is repeated in each of the time switches $CI_1$ and $CS_1$. In this example, the diagram allows for obtaining a connecting network of 1,024 network lines which can give access to 1,024 × 32 or approximately 32,000 circuits, or provided that there is no blocking, the formation of 16,000 conversation circuits since what is involved are hookups of four wires.

For purposes of rendering possible a better understanding of the present invention, a numerical example will be given for a telephone communication or the operations which follow each other in this order:

a. search for a free path b. path connection c. search for a busy path d. freeing of the path a. It is assumed that the choice of the incoming network line and of the outgoing network line of the time division stage-type connecting network as well as of the time channels on these network lines is made by exterior connections at the time division connecting network, for example by selection units.

It is assumed that the input of the connecting network consists of the time channel $t_5$ of the network line $LRE_1$ of the input switch $CE_1$, and that the output of the connecting network consists of the time channel $t_9$ of the network line $LRS_{32}$ of the output switch $CS_1$. In order to establish the hookup between input and output, it is necessary to find an intermediate switch having a free time channel on the incoming intermediate network line $LREI_1$ which unites it to the input switch $CE_1$ as well as a free time channel on the outgoing intermediate network line $LRSI_1$ which connects it to the output switch $CS_1$. In order to carry out this search for a free channel, one makes use of a storage of the conditions of engagement of the intermediate network lines. There has to be one binary element of engagement per time channel, or 32 binary elements for the condition of engagement of one incoming intermediate network line, such as $LREI_1$, and 32 binary elements for the condition of engagement of one intermediate outgoing network line, such as $LRSI_1$. The storage is assumed to consist of words of 32 binary elements. If $n$ is the number of incoming network lines and of outgoing network lines of one intermediate switch, there will thus have to be $2n$ words of 32 binary elements so as to give the condition of engagement of a single intermediate switch.

If there are $2n$ intermediate switches such as $CI_1$, the the central memory of the conditions of engagement $MCE_o$ must comprise $4n^2$ words of 32 binary elements each. If there are $n$ intermediate switches, there have to be $2n^2$ words of 32 binary elements.

The search for a free channel is thus carried out by reading in the central memory $MCE_o$ conditions of engagement of the intermediate switches, and more precisely in the $2n$ words of the switch being tested, the two words corresponding respectively to the input network line $LREI_1$ and to the output network line $LRSI_1$. The addresses of these two words are thus determined by the numbers $i$ and $j$ of the input and output switches.

If each of these two words contains one free time channel, the intermediate switch being tested as well as the two time channels which are found to be free are chosen in order to establish the path between the input and the output; otherwise one begins the operation again with the following intermediate switch.

By assuming the hypothetical case that the condition "1" of a binary element relative to the engagement of a time channel indicates the "busy" condition, and that the condition "0" indicates the "not-busy" (or free) condition, the search for a free time channel, not is made therefore, by searching for a binary element in the condition 0 among 32 binary elements of the word of the state of engagement of the network line.

In this example, where it is a question of establishing a connection between the input switch $CE_1$ and the output switch $CS_1$, one will begin by searching for a path in the intermediate switch $CI_1$, and for this purpose it is necessary to read the two words with 32 binary elements corresponding to the condition of engagement of the time channels on $LREI_1$ and $LRSI_1$, and thereafter to search for a binary element with the condition 0 in each of the two words by going from the binary element 1 toward the binary element number 32.

b. It is assumed that the free time channel on $LREI_1$ is the time channel $t_{20}$ and that the free time channel on $LRSI_1$ is the time channel $t_{25}$ (the time channels have been shown encircled in FIG. 2).

The complete connection is accomplished by writing:

in the control memory $MCE_1$ and in the word No. 20 of the block of 32 words associated with the register $RSE_1$ the address of the word No. 5 ($t_5$) of the block of 32 buffer words associated with the register $REE_1$;

in the control memory $MCI_1$ and in the word No. 25 of the block of 32 words associated with the register $RSI_1$ the address of the word No. 20 ($t_{20}$) of the block of 32 buffer words associated with the register $REE_1$;

in the control storage $MCS_1$ and in the word No. 9 ($t_9$) of the block of 32 words associated with the register $RSS_{32}$ the address of the word No. 25 ($t_{25}$) of the block of 32 buffer words associated with the register $RES_1$.

In order to establish a time shared telephone communication, two connections must be obtained; one from the calling subscriber to the subscriber being called, and a second one from the subscriber being called toward the calling subscriber. These connections are not independent in view of the fact that the modulation equipment of the subscriber is made up, at the same time, of "emission side" and "receiving side."

Hence, the number of the time channel of a calling subscriber determines the number of the time channel on the incoming network line (LRE) of the connection from the calling subscriber toward subscriber being called, and the number of time channel on the outgoing network line (LRS) of the connection from the subscriber being called to the calling subscriber.

When it is assumed that the numerical example given above corresponds to the connection between calling subscriber and subscriber being called, the inverse connection between the party called and calling subscriber will be established between the time channel $t_9$ (double circle) of the network line $LRE_{32}$ of $CE_1$ and the time channel $t_5$ (double circle) of the network line $LRS_1$ of $CS_1$. It is assumed that one makes use of the switch $CI_1$ and, in this switch, of the time channel $t_2$ of $REI_l$ and the time channel $t_3$ of $RSI_1$.

The connection is effected by writing in the control memory $MCE_1$, in the word No. 2 of the block of 32 words associated with the register $RSE_1$, the address of the word No. 9 of the 32 buffer words associated with the register $REE_{32}$;

in the control memory $MCI_1$, in the word No. 3 of the block of 32 words associated with the register $RSI_1$ the address of the word No. 2 of the block of 32 buffer words associated with the register $REI_1$;

in the control memory $MCS_1$, in the word No. 5 of the block of 32 words associated with the register $RSS_1$, the address of the word No. 3 of the block of 32 buffer words associated with the registers $RES_1$.

c. When the communication between parties ends, it is necessary to free the occupied path. The connecting network receives, therefore, the number of one of the incoming network lines LRE and of the time channel occupied on this network line by the communication which is coming to its conclusion. This information allows for finding again the two paths utilized for the communication.

The numbers of the incoming network line $LRE_1$ and of the time channel ($t_5$) of the path between calling subscriber toward subscriber being called are the same as those of the outgoing line $LRS_1$ and of the time channel ($t_5$) of the path between subscriber being called toward calling subscriber (see FIG. 3).

It is assumed that the calling subscriber has hung up first, and that one, therefore, has the following data concerning the communication:

number of the input switch $CE_1$ number of the input register $REE_1$ number of the time channel $t_5$ in this input register.

These data make it possible to say that this calling subscriber receives the code of his correspondent in the output switch $CS_1$ on the output register $RSS_1$ and during the time channel $t_5$. It is possible to "pick up again" this connection up to the input switch to which the subscriber being called is connected.

In fact, it is possible to read in the control memory $MCS_1$ associated with the outgoing network line $LRS_1$ toward the calling subscriber having the same number as the incoming network line $LRE_1$ originating from the calling subscriber, the content of the word (No. 5) having the same number as the time channel $t_5$ in the group of 32 words of the storage $MCS_1$ associated with the register $RSS_1$. This word No. 5 contains the address of the word of the buffer memory $MTS_1$ of the output switch $CS_1$ used by the path. This address is also that of the outgoing intermediate network line $LRSI_1$ and of the time channel $t_3$ used between the intermediate switch $CI_1$ and the output switch $CS_1$; that is to say, that of the word of the control memory of the intermediate switch used by the path. This control memory $MCI_1$ contains the number of the buffer memory and of the time channel; in other words, the numbers of the incoming network line $LREI_1$ and of the time channel $t_2$ used between the intermediate switch $CI_1$ and the input switch $CE_1$; it is thus also the address of the word of the control memory of the input switch that is used by the path. This control memory ($MCE_1$) contains the number of the buffer memory and the time channel i.e., the numbers of the incoming network line $LRE_{32}$ and of the temporary path $t_9$ used in the input switch $CE_1$. The last-mentioned numbers of the network line $LRE_{32}$ originating from the subscriber being called, and of the time channel $t_9$, are further the same as the numbers of the outgoing network line $LRS_{32}$ toward the subscriber being called and of the time channel $t_9$ used by the path between subscriber being called and the calling subscriber.

In order to search for this complementary path, one proceeds as for the other part by starting from the output toward the input.

In fact, the last information obtained ($LRS_{32}$ and $t_0$) permits reading in the control memory $MCS_1$ the word No. 9 of the block of 32 words associated with the register $RSS_{32}$ which contains the number of the time channel $t_{25}$ used on the intermediate network line $LRSI_1$. It is thus possible to read in the intermediate control memory $MCI_1$ the word No. 25 of the block of 32 words associated with the intermediate output register $RSI_1$. This word contains the number of the time channel $t_{20}$ used by the intermediate network line $LREI_1$. Hence, in the control memory $MCE_1$ and in the word No. 20 of the block of 32 words associated with the register $RSE_1$ one finds again the information which one had at the start, that is to say, the numbers of the time channel $t_5$ of the network line $LRE_1$, which are used by the calling subscriber.

The comparison of the information given at the start, and of the last information read renders it possible to effect a test of good operation of the path search.

d. The freeing of the paths is made simply by erasing the words of the control memory used for connecting in each switch being used the input and the output. It is also necessary to reset to zero, in the memory for the conditions of engagement, the binary elements corresponding to the path which has just been released or disengaged.

FIG. 3 represents the two itineraries between caller DR and person called DE through a connecting network in stages RC. This is a time network of the same type as that which is shown in a spatial manner in FIG. 1 and with the time structure of FIG. 2. The time connecting network RC thus comprises input switches such as $CE_1$, intermediate switches such as $CI_1$, and the output switches, such as $CS_1$. The modulation equipment of the subscribers is represented by M, allowing for the patterning and multiplexing of the network lines. In order to assure a conversation between the caller and the person called it is necessary, in fact, that there be two incoming network lines, for example $LRE_1$ and $LRE_{32}$, and two outgoing network lines, for example $LRS_1$ and $LRS_{32}$. The incoming network line $LRE_1$ is assumed to be coming from the caller, and the incoming network line $LRE_{32}$ as coming from the person called; it is the same with respect to the outgoing lines: $LRS_1$ assumed to be for of the caller and $LRS_{32}$ for of the person called. It is to be noted that the same time channel, for example $t_5$, is found at the modulation equipment of the caller M for the incoming network line $LRE_1$ as for the outgoing network line $LRS_1$. This is also true analogously for the time channel $t_9$for the modulation equipment of the person called which is the same for $LRE_{32}$. Other time channels are taken between the switches, for example $t_{20}$between $CE_1$ and $CI_1$ and $t_{25}$between $CI_1$ and $CS_1$ in the direction caller toward person called, and $t_2$ and $t_3$ respectively between $CE_1$ and $CI_1$ and between $CI_1$ and $CS_1$ in the direction from person called toward caller.

If it is assumed that $CE_1$ is united to $CI_1$ by a single network line $LREI_1$, and the intermediate switch $CI_1$ is united to $CS_1$ by a single network line $LRSI_1$ (as shown in FIG. 2), the time channels $t_2$and $t_{20}$thus belong to the same line $LREI_1$, and the time channels $t_3$ and $t_{25}$ appertain to the same line $LRSI_1$. Hence there are two time channels occupied on 32 on each network line, in other words, each network line allows for 16 simultaneous conversations.

It is understood that the present invention is not limited to the embodiment described herein and shown in the accompanying drawing, which are to be taken only by way of example. More particularly, modifications of specific details may be carried out and equivalent means may be substituted for specific means disclosed without departing from the spirit and scope of the present invention.

I claim:

1. A path finding system for a time division multiplex communication network comprising a multi-stage switching arrangement including at least on input stage, intermediate stage and output stage, each stage being formed of a number of time switches, each having a number of incoming network lines and a number of outgoing network lines, each network line including a plurality of time channels and the switches having the same internal time division switching arrangement, said system comprising:

a central storage means coupled to said intermediate stage for storing the busy or free condition of all the time channels of the incoming and outgoing network lines of each time switch in said intermediate stage; and means, coupled between said central storage means and said intermediate stage, for reading into said storage means the condition of each intermediate time switch and for writing in each intermediate time switch the busy or free condition of each time channel in the incoming and outgoing network lines.

2. A path finding system according to claim 1, wherein each time switch comprises $n$ input network lines and $m$ output lines;

each intermediate time switch comprises $p$ inputs and $q$ outputs each output time switch comprises m inputs and n outputs;

said input stage comprises $n$ input time switches;

said intermediate stage comprises m intermediate time switches; and said output stage comprises $n$ output time switches, wherein each network line comprises the same number of time channels, there being the same number of intermediate incoming network lines between input time switches and said intermediate time switches, and the same number of intermediate outgoing network lines between said intermediate time switches and said output time switches, and wherein said storage means, by storing therein the condition of each intermediate time switch, can enable the establishment of two paths through said system, one in a direction from the calling party to the called party, the other in a direction from the called party to the calling party, when a communication is to be set up between calling and called subscribers through said network.

3. A path finding system according to claim 2, including means for effecting a communication path between the calling and called subscribers over two separate paths each of which traverses the input stage, intermediate stage and said output stage, in the same direction.

4. A path finding system according to claim 3 wherein each network line includes 32 time channels and wherein each intermediate time switch has the same number of inputs as outputs, thereby forming a square matrix switch, each intermediate time switch having $n$ incoming intermediate network lines and $n$ outgoing intermediate network lines, and wherein said central storage means comprises, for every intermediate time switch $2n$ words of 32 binary elements, so as to store the condition of one of said intermediate time switches.

5. A path finding system according to claim 3, wherein said network comprises only three stages, including an input stage comprising $p$ input time switches each with $n$ inputs and $m$ outputs, an intermediate stage comprising $m$ intermediate time switches each with $p$ inputs and $q$ outputs, an output stage comprising $q$ output time switches each with $m$ inputs and $n$ outputs, each input time switch receiving $n$ incoming network lines with $x$ time channels and its $m$ outputs being connected to respective inputs of the $m$ intermediate time switches, each output time switch having $n$ outgoing network lines with time channels, the $m$ inputs of each output time switch being connected to the respective outputs of the $m$ intermediate time switches, the $p$ inputs and $q$ outputs of each intermediate time switch being thus respectively connected to the $p$ input time switches and the $q$ output time switches, so that the network thus determined comprises $n^2$ incoming lines and $n^2$ outgoing lines, so that a connection between any time channel of the $n^2$ incoming network lines and any time channel of the $n^2$ outgoing network lines is possible, whereby a communication may be provided with or without blocking with respect to the number $m$ of time switches in said intermediate stage.

6. (Twice Amended) A path finding system according to claim 3, wherein said system employs three stages, the input stage comprising $n$ time switches with $m$ inputs and $(2n-1)$ outputs, the intermediate stage comprised $(2n-1)$ time switches with $n$ inputs and $n$ outputs and the output stage comprises $n$ time switches with $(2n-1)$ inputs and outputs, a portion of said multiplex connections being connected between said $(2n-1)$ outputs of each of said input time switches and the inputs of the $(2n-1)$ intermediate t me switches, while the other of said multiplex connections are connected between the $(2n-1)$ inputs of each output time switch and the $(2n-1)$ intermediate time switches, whereby a time division multiplex network is formed without blocking having $n^2$ incoming network lines and $n^2$ outgoing network lines.

7. A path finding system according to claim 3, wherein in response to the state of an incoming network line and one of the time channels associated therewith, and the state of an outgoing network line and one of the time channels associated therewith, a communication path is provided between the calling and called subscriber, whereby the coded signal transmitted by one subscriber toward the other subscriber over the communication network and the signal transmitted by said other subscriber to said one subscriber will be transmitted simultaneously if an identification code for the incoming network and its time channel are inversely identical with an identification code of the outgoing network and its associated time channel.

8. A path finding system according to claim 3, wherein each input time switch, output time switch and intermediate time switch comprises $n$ input registers, each of which receive one network line, said $n$ input registers being associated with one buffer memory, and $n$ output registers, each of which is connected with one network line, said $n$ output registers being connected with a respective storage device provided in each time switch, and wherein the storage device associated with said input time switch contains the address of a time channel of the output register associated with the incoming intermediate network line corresponding to the intermediate time switch, the storage device associated with said intermediate time switch the storage of a time channel of the output register associated with the outgoing intermediate network line connected with the output time switch and the storage device of the output time switch contains the address of a time channel associated with the outgoing network line, so as to effect a communication path through each of said stages.

* * * * *